April 2, 1963   L. PÉRAS   3,083,650
CONVEYORS
Filed June 23, 1960   2 Sheets-Sheet 2
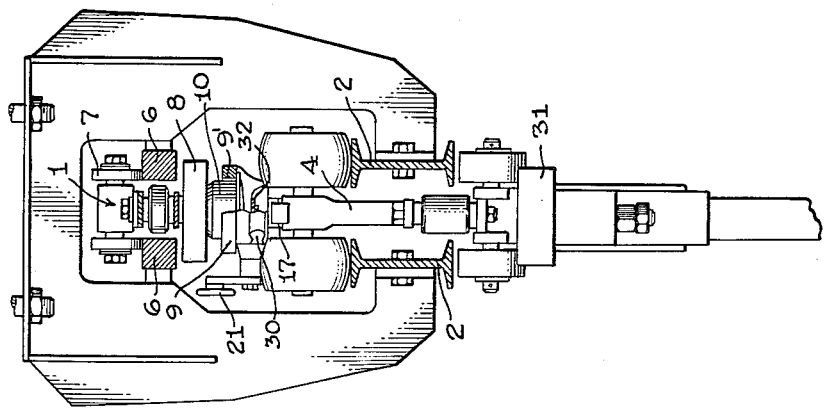
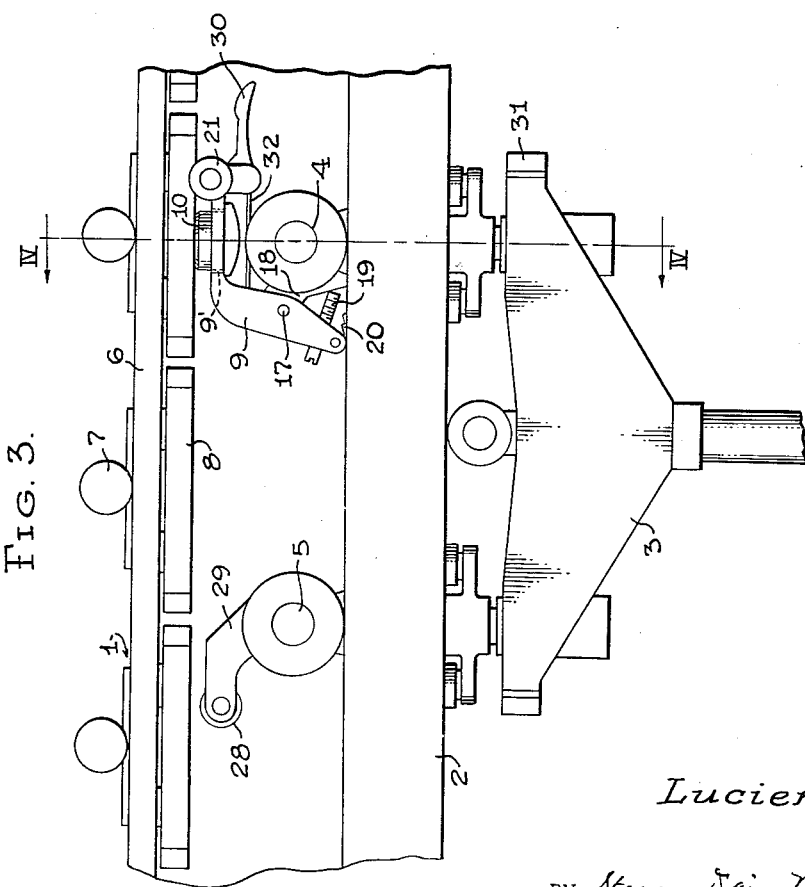
INVENTOR
Lucien Péras
BY Stevens, Davis, Miller & Mosher
ATTORNEYS

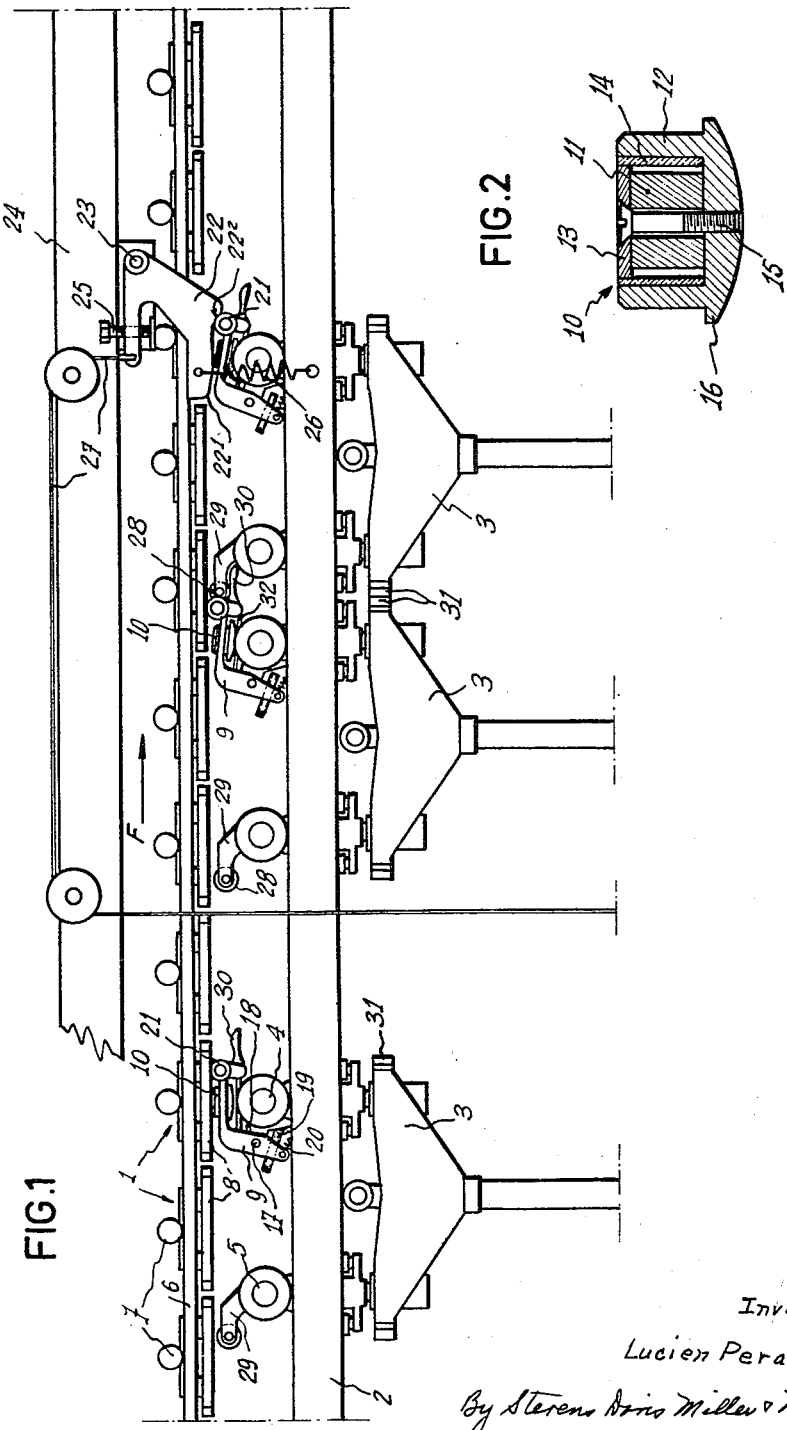

United States Patent Office 3,083,650
Patented Apr. 2, 1963

3,083,650
CONVEYORS
Lucien Péras, Billancourt, France, assignor to Regie Nationale des Usines Renault, Billancourt, France
Filed June 23, 1960, Ser. No. 38,215
Claims priority, application France June 25, 1959
4 Claims. (Cl. 104—172)

This invention relates in general to conveyors and more particularly to conveyors of the type comprising an endless chain adapted to carry along trolleys or like carriages for transporting loads, which roll on a track parallel to the chain.

It is the essential object of this invention to provide in a conveyor of this type an improved trolley driving system whereby the operation of the conveyor is rendered more reliable and flexible than in conventional conveyor systems wherein the drive is effected through lugs co-acting with stops or various hooking members or devices.

According to this invention the trolleys are driven through the medium of magnetic or electromagnetic members carried by said trolleys and co-acting with shoes carried by the chain, said members normally engaging, and adhering magnetically on said shoes.

This invention is also concerned with a number of different arrangements whereby, notably, a conveyor incorporating these arrangements is particularly adapted to permit the gathering and stoppage of trolleys or carriages with their load at a predetermined point along the conveyor circuit, from which they can be re-started at will.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing, in which:

FIGURE 1 is a longitudinal and elevational view showing one portion of a conveyor constructed according to the teachings of this invention;

FIGURE 2 is a detail view showing in cross-section the structure of a magnet unit equipping the carriages or trolleys of this conveyor;

FIGURE 3 is a side elevational view of the conveyor and the trolley on a larger scale than FIGURE 1, and, FIGURE 4 is a vertical cross-sectional view taken on line 4—4 of FIGURE 3 and showing the trolley in end elevation.

Referring to the drawings, the overhead conveyor illustrated diagrammatically therein comprises an endless chain 1 driven continuously from adequate means (not shown) and a carrier track 2 underlying this chain; load-carrying trolleys or carriages 3, each provided with a front axle 4 and a rear axle 5, are adapted to roll on the track 2. The chain 1 consists essentially of hingedly interconnected links guided for movement parallel to the track 2 by another track 6 engaged to this end by rollers 7 carried by the aforesaid links.

According to this invention, this chain is equipped under each train of rollers 7 with shoes 8 extending beneath the track 6 and registering with the trolley track 2.

Moreover, mounted on the front axle of each trolley is a magnet carrier 9 in which a screened magnet 10 is mounted and adapted normally to engage one of the shoes 8 of the endless chain so that the magnetic attraction exerted therebetween will cause the trolley to be carried along by the chain in the direction of motion thereof as indicated by the arrow F.

As shown in FIG. 2, the magnet unit 10 comprises a cylindrical metal block 11 constituting a permanent magnet, which is mounted in a shield 12 constituting an open socket in which the magnet 11 is retained under a magnetically permeable washer 13 insulated from the shield by a screen 14, an assembly screw 15 extending through the washer 13 and block 11 and being screwed in the shield 12.

The shield 12 is formed with an outer peripheral flange 16 constituting a magnet-retaining shoulder, the magnet block being slidably mounted in a corresponding bore 9' (FIGS. 3 and 4) formed in the magnet carrier 9.

Now it will be seen that the magnet and therefore its shield 12 are mounted in this bore 9' with a sufficient side play so that the magnet may swivel more or less and engage the chain shoes as most convenient.

These shoes 8 may be made from mild steel stock.

On the other hand, it will be seen in FIG. 1 that each magnet carrier 9 is mounted for longitudinal tilting movement about a pivot pin 17 of which the support 18 is rigid with the corresponding axle.

Each magnet carrier is thus adjustable by means of a stop screw 19 urged by a tension spring 20 toward the support 18. In this adjustment position the magnets adhere freely to the shoes supported by the chain.

The trolleys with their loads may easily be stopped at any desired location along the conveyor circuit, as illustrated in FIG. 1.

To this end, on each front axle of the trolleys the magnet carrier 9 is provided with at least one lateral roller or wheel 21 adapted to co-act with a cam 22 whereby the magnet may be separated from the relevant shoe by tilting the magnet carrier away from the chain.

This cam 22 is formed at the front with a contour comprising a leading portion 22¹ adapted to brake the trolley while tilting the magnet carrier, and at the rear with an abutment 22² adapted to absorb the residual kinetic energy of the trolley and stop same completely.

The cam 22 also acts as a stop retractable at will, for example when it is desired to re-start a previously stopped trolley.

This cam member is fulcrumed on a pivot pin 23 carried by a support 24 on which the cam control means are mounted, this cam being on the other hand adjustable in the trolley stopping position by means of a stop screw device 25 comprising a tension spring 26 urging the cam downward.

In the embodiment illustrated the cam is actuatable by means of a cord or cable 27 controlled in any suitable manner, for example manually or by means of servo-control means.

In FIG. 1 the first trolley on the right has come to a standstill and the next trolley on the left has been stopped by the preceding trolley.

To this end, the rear axle 5 of each trolley is provided with a roller 28 carried by the rear end of a cranked arm 29 adapted to be engaged from underneath by a tongue 30 formed with an upper cam face and provided on each magnet carrier 9 for tilting same in the direction to separate the magnet from the relevant shoe and therefore to brake and stop each trolley arriving behind any other previously stopped trolley.

The abutment contact between adjacent trolleys which results therefrom may thus be contemplated between the conventional bumpers 31 of the trolleys.

The drawing also shows that when the trolleys are stopped the magnets just separated from their relevant shoes drop backward into the tilted magnet carrier where they are retained by a catch 32.

Of course, this form of embodiment is given by way of example only and should not be construed as limiting the invention.

Moreover, it will be readily understood by anybody conversant with the art that the arrangements constituting the subject-matter of this invention are applicable to any chain conveyor or like apparatus carrying along trolleys or like carriages rolling on a carrier track parallel to the driving chain, whether the latter runs above (as in this example of overhead conveyor) or beneath as in other known types of conveyors.

I claim:

1. A conveyor comprising an endless driven chain, a supporting track disposed parallel to said chain, load-transporting trolleys movable on said track, supports carried by said trolleys, magnetic elements mounted in said supports, members carried by said chain with which the magnetic elements are adapted to cooperate by attraction and magnetic adhesion to achieve a chain-trolley connection, said magnetic elements being pivotally mounted with play in said supports so that they will adhere to and be placed in perfect, direct contact with said members carried by said chain at the passing thereof.

2. A conveyor as claimed in claim 1, wherein said supports are pivotally mounted on the trolleys and means is provided to control the movement of the supports to achieve the separation of said magnetic elements and members and thus interrupt the chain-trolley connection.

3. A conveyor as claimed in claim 1, wherein said supports are pivotally mounted on the trolleys and resiliently urged to a position wherein said magnetic elements are engaged with said members and cam means is provided and acts as an abutment for braking and stopping said trolleys and also controls the movement of the supports to achieve the separation of said magnetic elements and members, and control means is provided for retracting said cam means for the purpose of re-starting any previously stopped trolley.

4. A conveyor as claimed in claim 1, wherein said trolleys have forward and rearward ends, said supports being pivotally mounted on the forward ends of said trolleys and means carried by the rearward ends for causing the support of a rearward adjoining trolley to be moved to cause the magnetic element of said rearwardly adjoining trolley to be moved away from the corresponding member on the driven chain.

References Cited in the file of this patent
UNITED STATES PATENTS

| | | |
|---|---|---|
| 1,020,943 | Bachelet | Mar. 19, 1912 |
| 1,719,231 | McLaren | July 2, 1929 |
| 2,239,395 | Mallory | Apr. 22, 1941 |
| 2,630,765 | Small | Mar. 10, 1953 |